(12) United States Patent
Jedliński et al.

(10) Patent No.: US 10,794,499 B2
(45) Date of Patent: Oct. 6, 2020

(54) SERVO VALVE HOUSING

(71) Applicant: Hamilton Sundstrand Corporation, Charlotte, NC (US)

(72) Inventors: Marek Jedliński, Wroclaw (PL); Maciej Zak, Wroclaw (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/434,209

(22) Filed: Jun. 7, 2019

(65) Prior Publication Data

US 2019/0390783 A1 Dec. 26, 2019

(30) Foreign Application Priority Data

Jun. 24, 2018 (EP) .................................. 18461568

(51) Int. Cl.
| | |
|---|---|
| *F16K 11/07* | (2006.01) |
| *F16K 31/06* | (2006.01) |
| *F15B 13/04* | (2006.01) |
| *F15B 13/043* | (2006.01) |

(52) U.S. Cl.
CPC ...... *F16K 11/0712* (2013.01); *F15B 13/0438* (2013.01); *F16K 31/0613* (2013.01)

(58) Field of Classification Search
CPC .. F16K 11/0712; F16K 17/32; F16K 31/0603; F16K 31/0613; Y10T 137/8671; F15B 13/0402; F15B 13/043; F15B 13/0438
See application file for complete search history.

(56) References Cited

U.S. PATENT DOCUMENTS

| 2,655,904 A | 10/1953 | Strayer et al. |
| 3,498,308 A * | 3/1970 | George ................ H03M 1/00 137/85 |
| 3,556,150 A | 1/1971 | King |

(Continued)

FOREIGN PATENT DOCUMENTS

| DE | 3919617 A1 | 12/1990 |
| EP | 3205913 A1 | 8/2017 |
| EP | 3284954 A1 | 2/2018 |

OTHER PUBLICATIONS

Extended European Search Report for International Application No. 18461568.0 dated Dec. 19, 2018, 8 pages.

*Primary Examiner* — Kelsey E Cary
(74) *Attorney, Agent, or Firm* — Cantor Colburn LLP

(57) ABSTRACT

A nozzle housing for a servo valve includes a circumferential wall defining a return passage extending along a longitudinal axis (A) for holding a return nozzle, the return passage having an opening for fluid communication with a spool valve and a return port for fluid communication with atmosphere, a first plate extending across the return passage, the first plate engaged with the circumferential wall and disposed between the opening and the return port, and a second plate extending across the return passage. The second plate engages with the circumferential wall and disposed between the first plate and the return port, the first plate has at least one first aperture, and the second plate has at least one second aperture that is misaligned with the at least one first aperture such that there is no linear axial flow path between the return port and the opening.

15 Claims, 4 Drawing Sheets

(56) References Cited

U.S. PATENT DOCUMENTS

| | | | |
|---|---|---|---|
| 4,131,130 A | 12/1978 | Ruby | |
| 4,664,135 A * | 5/1987 | Hayner | F15B 13/043 |
| | | | 137/625.64 |
| 6,277,293 B1 | 8/2001 | Taylor et al. | |
| 6,648,014 B1 | 11/2003 | Takahashi et al. | |
| 2007/0277670 A1* | 12/2007 | Spickard | F15B 13/0438 |
| | | | 91/392 |
| 2015/0292525 A1* | 10/2015 | Baker | F15B 13/0438 |
| | | | 137/14 |
| 2016/0102778 A1* | 4/2016 | Hoemke | F16K 1/34 |
| | | | 137/12 |
| 2017/0232563 A1* | 8/2017 | Sawicki | F15B 19/002 |
| | | | 29/446 |
| 2019/0118315 A1* | 4/2019 | Kozlowski | F16K 51/00 |

* cited by examiner

SERVO VALVE HOUSING

FOREIGN PRIORITY

This application claims priority to European Patent Application No. 18461568.0 filed Jun. 24, 2018, the entire contents of which is incorporated herein by reference.

TECHNICAL FIELD

The present disclosure relates to a housing for a single stage air servo valve.

BACKGROUND

Servo valves are well-known in the art and can be used to control the flow and pressure of fluid to an actuator via a spool valve. Typically, a flapper is deflected by an armature connected to an electric motor away or towards one or more nozzle(s), which controls the fluid flow and pressure to the valve. Deflection of the flapper can control the amount of fluid injected from the nozzle(s), and thus the amount of fluid communicated to the actuator via the spool valve. In this way, servo valves allow precise control of actuator movement.

In some single stage air servo valves, a return nozzle is in fluid communication with the atmosphere. Under normal operating conditions, air continuously flows from the return nozzle to the atmosphere. This protects the device from external contaminants such as sand and dust. However, when there is no or low flow from the return nozzle, for example when the device is not operational, there is a high risk of contamination from particles of sand or dust flowing from the atmosphere into and through the return nozzle. These particles can enter the servo valve and the actuator, which may reduce control, block flow or movement, and/or damage components.

SUMMARY

According to one embodiment of the present disclosure, there is provided a nozzle housing for a servo valve, the nozzle housing comprising a circumferential wall defining a return passage extending along a longitudinal axis for holding a return nozzle, the return passage having an opening for fluid communication with a spool valve and a return port for fluid communication with atmosphere, a first plate extending across the return passage, the first plate engaged with the circumferential wall and disposed between the opening and the return port, and a second plate extending across the return passage, the second plate engaged with the circumferential wall and disposed between the first plate and the return port, wherein the first plate has at least one first aperture, and the second plate has at least one second aperture that is misaligned with the at least one first aperture such that there is no linear axial flow path between the return port and the opening.

By "misaligned" or "offset", it is meant that no portion of an aperture of one plate is aligned with any portion of an aperture of the other plate when viewed along the axial direction (e.g. from the return port, along the axis towards the opening). This misalignment or offset therefore provides no linear axial flow path through the apertures. As such, there is no linear axial flow path from the return port to the opening.

By "engaged", it is meant that the plates are substantially in contact with the circumferential wall around the entire circumference, such that few or no gaps are formed, and any such gaps are much smaller than the apertures.

The at least one first aperture may comprise a plurality of first apertures and the at least one second aperture may comprise a plurality of second apertures.

Each of the plurality of second apertures may be disposed an equal distance or circumferential angle from the two nearest first apertures.

The first plate, the second plate and the nozzle housing may be made from the same material.

At least one debris removal passage may extend through the circumferential wall, and the at least one debris removal passage may have an inlet axially between the first plate and the second plate.

The at least one debris removal passage may comprise a plurality of circumferentially spaced debris removal passages.

A separating ring may be disposed in the return passage between the first plate and the second plate, and the separating ring may comprise an annular wall having at least one opening extending radially therethrough and in fluid communication with the inlet of the at least one debris removal passage.

A retention ring may be disposed between the second plate and the return port, and the retention ring may retain the first plate, the separating ring and the second plate in the return passage.

The circumferential wall may comprise a stop, and the first plate may be disposed between the stop and the retention ring.

Each of the first plate, the separating ring, the second plate and the retention ring may have at least one anti-rotation tab, and each anti-rotation tab may engage a groove in the circumferential wall.

The first plate and the second plate may each have at least one anti-rotation tab, and each anti-rotation tab may engage a groove in the circumferential wall.

The first plate and the second plate may be planar.

The first plate and the second plate may extend radially across the return passage.

The first plate, the separating ring, the second plate, the retention ring and the nozzle housing may be made from the same material.

The present disclosure also provides a single stage air servo valve comprising the nozzle housing described above, wherein the nozzle housing comprises a flapper cavity and first and second nozzle cavities, the first nozzle cavity comprises the return passage, the second nozzle cavity comprises a supply passage, the supply passage has an inlet, an opening, and a supply nozzle disposed therebetween, and the return passage has a return nozzle disposed between the opening of the return passage and the first plate, and a flapper disposed in the flapper cavity between the opening of the supply passage and the opening of the return passage.

The first and second nozzle cavities may be coaxial.

A total cross-sectional area of the at least one first aperture may be at least five times greater than a cross-sectional area of an orifice of the return nozzle, and may be similar to that of the at least one first aperture.

A total cross-sectional area of the at least one second aperture may be at least five times greater than a cross-sectional area of an orifice of the return nozzle.

BRIEF DESCRIPTION OF THE DRAWINGS

Some exemplary embodiments and features of the present disclosure will now be described by way of example only, and with reference to the following drawings in which.

DETAILED DESCRIPTION

Figure 1:
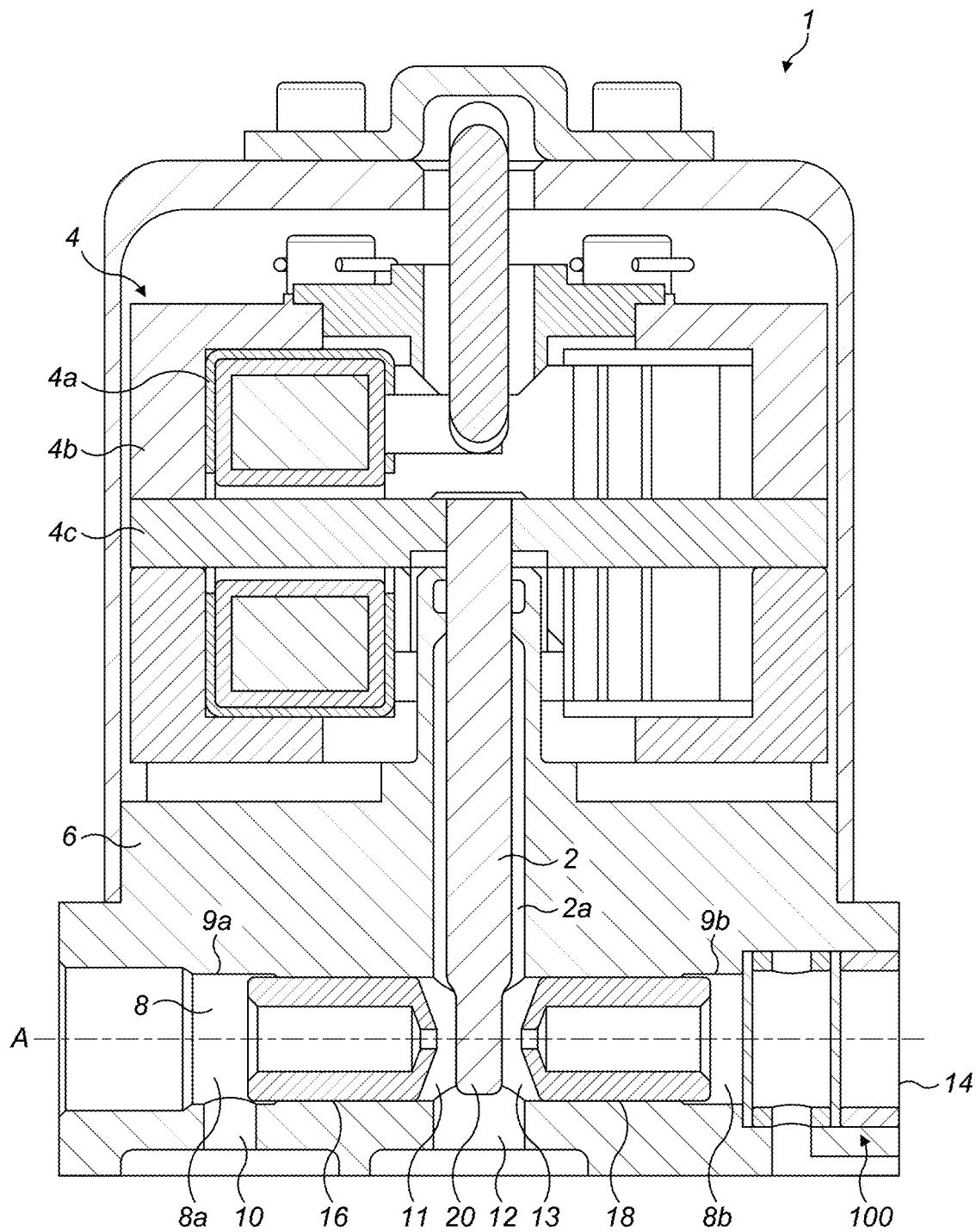
FIG. 1 shows an example of a single stage air servo valve.

With reference to FIG. 1, a single stage air servo valve 1 is illustrated. The servo valve 1 comprises a flapper 2, an electric motor 4, and a nozzle housing 6. The electric motor 4 comprises coils 4a, permanent magnets 4b and an armature 4c. The coils 4a are in electrical communication with an electrical supply (not shown) and, when activated, interact with the permanent magnets 4b to move armature 4c, as is well-known in the art.

The flapper 2 is disposed in a flapper cavity 2a in the nozzle housing 6 and is attached to the armature 4c. The flapper 2 is deflected by movement of the armature 4c.

The nozzle housing 6 comprises a nozzle cavity 8 extending along a longitudinal axis A, a supply passage 8a and a return passage 8b. The supply passage 8a may be defined by a circumferential wall 9a. The return passage may be defined by a circumferential wall 9b. The supply passage 8a and the return passage 8b may be co-axial. A supply port 10 provides an inlet to the supply passage 8a, and an opening 11. A control port 12 is fluidly between the supply passage 8a and the return passage 8b. An opening 13 provides an inlet for the return passage 8b, and a return port 14 provides an outlet for the return passage 8b. A supply nozzle 16 is housed within the supply passage 8a via interference fit therewith, and a return nozzle 18 is housed within the return passage 8b via interference fit therewith. The flapper 2 comprises a blocking element 20 at an end thereof and proximate the control port 12, and is disposed between the supply passage 8a and the return passage 8b.

The supply port 10 allows for the communication of air to the supply nozzle 16. The blocking element 20 selectively interacts with the supply nozzle 16 to meter the flow of air from the supply nozzle 16 to a spool valve (not shown) via the control port 12. The blocking element 20 also selectively interacts with the return nozzle 18 to meter the flow of air from the control port 12 through the return nozzle 18 via the opening 13 to the return port 14. The return port 14 is in fluid communication with the atmosphere.

The electric motor 4 is used to control a deflection of the blocking element 20 to vary the interaction between the blocking element 20 and the supply and return nozzles 16 and 18, thus modulating the pressure of air to the control port 12.

Figure 2:
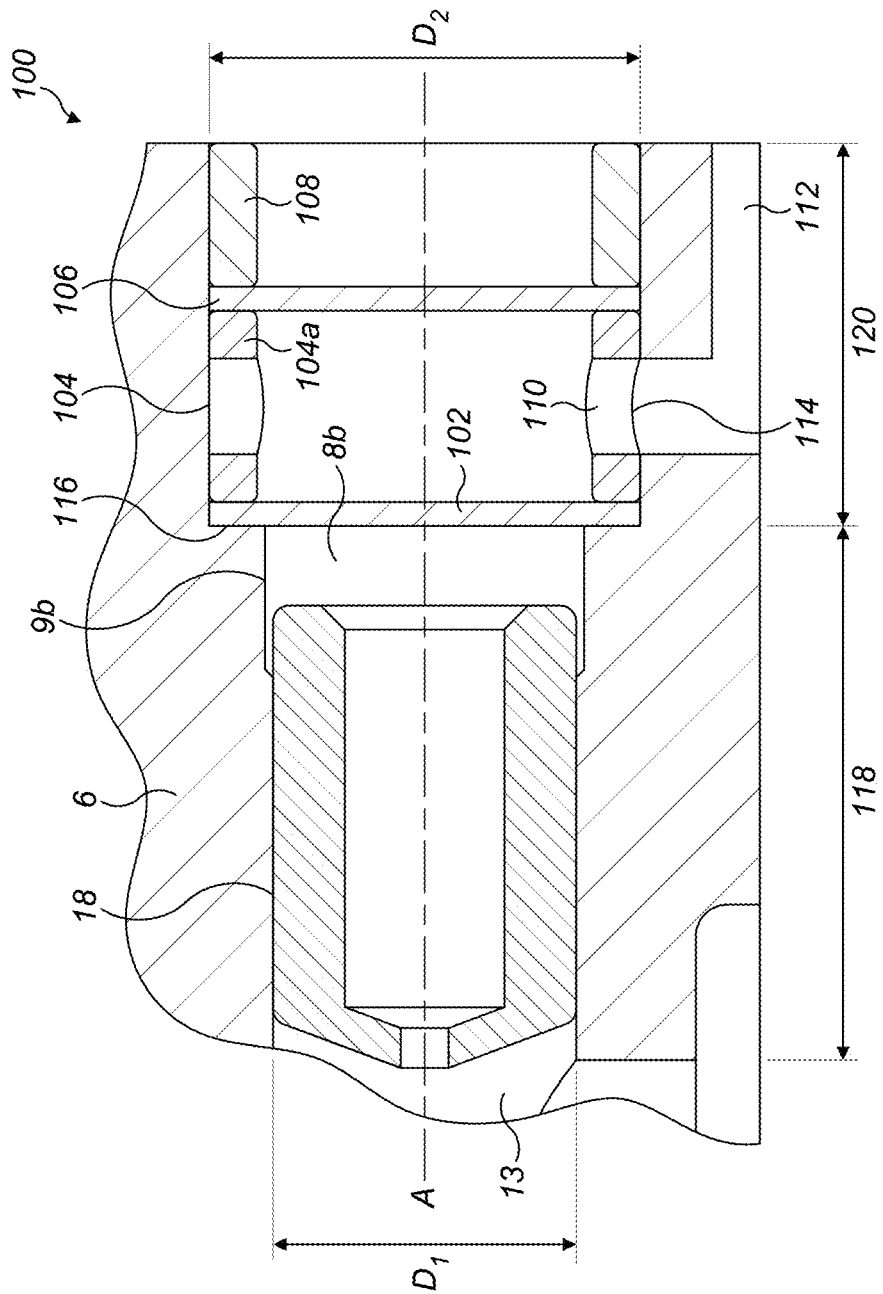
FIG. 2 shows a detailed cross-sectional view of a portion of a nozzle housing of a single stage air servo valve having an insert.
Figure 3:
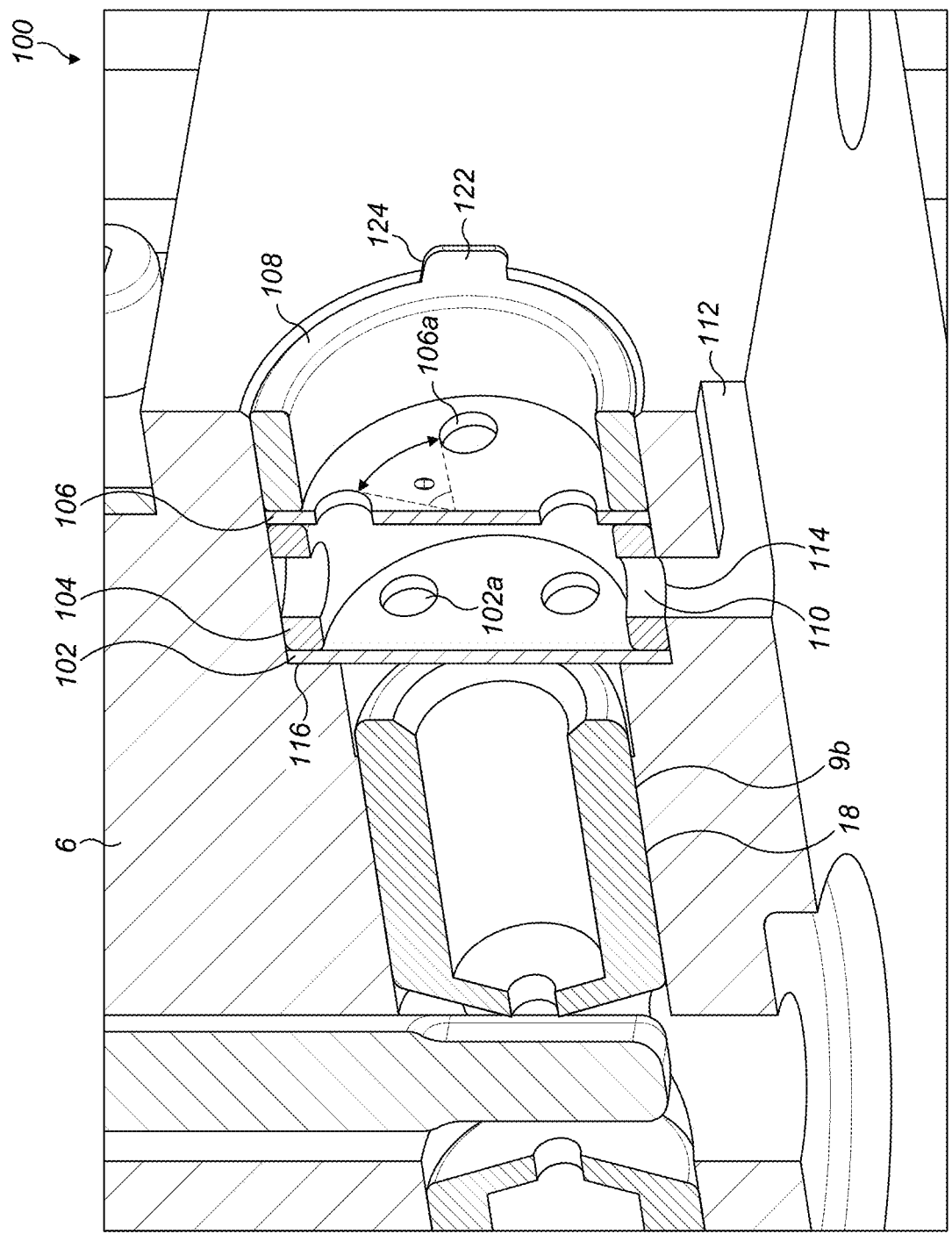
FIG. 3 shows an isometric view of the portion of the nozzle housing of FIG. 2.
Figure 4:
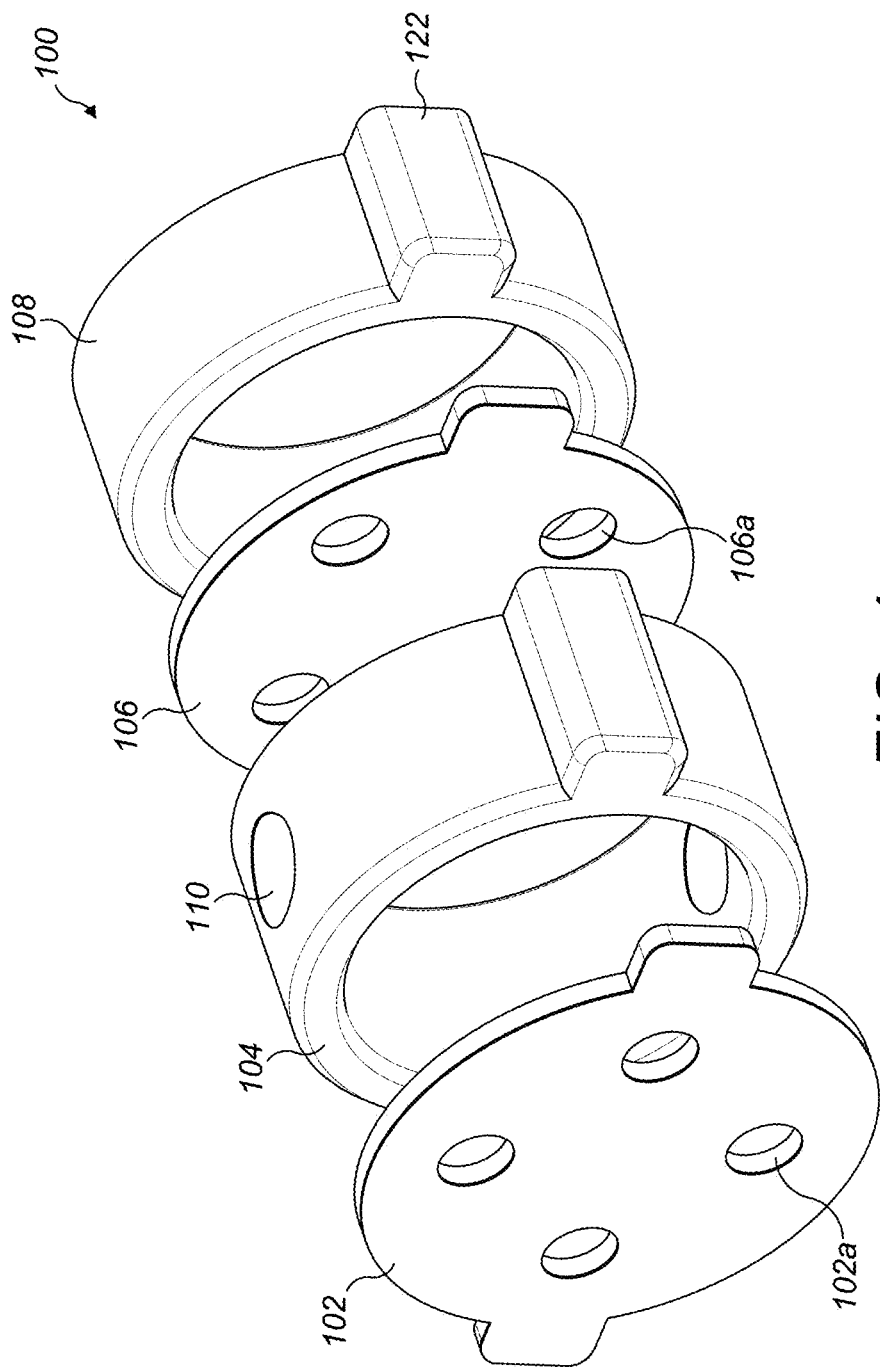
FIG. 4 shows an exploded isometric view of the insert of FIG. 2.

With reference to FIGS. 2 to 4, a return passage 8b in accordance with an embodiment of the present disclosure is provided with an insert 100 comprising a first plate 102 and a second plate 106. Each of the plates 102 and 106 may extend radially across the return passage 8b to interact with a flow of air therethrough. Each of the plates 102 and 106 may engage with the circumferential wall 9b of the return passage 8b such that few or no gaps are provided between the first plate 102 and the circumferential wall 9b or between the second plate 106 and the circumferential wall 9b.

The first plate 102 is provided with at least one aperture 102a, and the second plate 106 is provided with at least one aperture 106a. The apertures 102a and 106a allow air to flow through the first plate 102 and the second plate 106. The at least one aperture 106a of the second plate 106 is misaligned with the at least one aperture 102a of the first plate 102. In other words, the at least one aperture 106a of the second plate 106 is circumferentially and/or radially offset from the at least one aperture of the first plate 102.

In one embodiment, the first plate 102a may have a plurality of apertures 102a and the second plate 106 may have a plurality of apertures 106a. In this embodiment, all of the plurality of apertures 102a of the first plate 102 are misaligned with all of the plurality of apertures 106a of the second plate 106 such that no linear axial flow path is provided between any of the plurality of apertures 102a of the first plate 102 and any of the plurality of apertures 106a of the second plate 106.

The first plate 102 may be provided with one, two, three, four or more apertures 102a. The second plate 106 may be provided with one, two, three, four or more apertures 106a. A total cross-sectional area of the apertures 102a of the first plate 102 may be substantially equal to a total cross-sectional area of the apertures 106a of the second plate 106. A total cross-sectional area of the first and/or second plurality of apertures 102a, 106a may be at least five times greater than a cross-sectional area of an orifice of the return nozzle 18. This ensures that the pressure drop caused by the plates 102, 106 is negligible (compared to that caused by the return nozzle 18), and that the normal operation of the servo valve is not affected.

The first plate 102 and the second plate 106 may be provided with the same number of apertures 102a and 106a. The apertures 102a and 106a may be disposed an equal distance from the longitudinal axis A, and/or may be equally circumferentially spaced. The apertures 102a and 106a may all have the same area. The apertures 106a of the second plate 106 may be misaligned with the apertures 102a of the first plate 102 such that each aperture 102a of the first plate 102 is misaligned from the two nearest apertures 106a of the second plate 106 by an equal distance or circumferential angle.

For example, in the illustrated embodiment of FIG. 3, the first plate 102 and the second plate 106 are provided with the same arrangement of four apertures 102a, 106a. Each aperture 102a, 106a is equally radially spaced from the longitudinal axis A, and each aperture 102a, 106a is equally circumferentially spaced by 90 degrees. However, the arrangement of apertures 106a of the second plate 106 is rotated by 45 degrees relative to the arrangement of apertures 102a on the first plate 102, such that each aperture 106a of the second plate 106 is offset or misaligned from the two nearest apertures 102a of the first plate 102 by 45 degrees.

Although four apertures are shown for each plate in the illustrated embodiment, it is to be understood that any number of equally circumferentially spaced apertures may be provided. For example, one, two, three, five, or six equally circumferentially apertures 102a, 106a may be provided on each plate 102, 106, and the arrangement of apertures 106a on the second plate 106 may be misaligned or rotated relative to the arrangement of apertures 102a on the first plate 102 by 90 degrees, 60 degrees, 36 degrees or 30 degrees respectively, such that each aperture 102a of the first plate 102 is misaligned from the two nearest apertures 106a of the second plate 106 by an equal distance or circumferential angle.

For any number of equally circumferentially spaced apertures per plate, the misalignment or rotation of the arrangement of apertures 106a of the second plate 106 relative to the arrangement of apertures 102a of the first plate 102 may be provided by:

$$\theta = \frac{180}{n}$$

where n is the number of apertures provided per plate, and θ is the angle of relative misalignment or rotation that provides equal aperture spacing as described above.

The nozzle housing 6 further comprises at least one debris removal passage 112 extending through the circumferential wall 9b. The debris removal passage 112 comprises an inlet 114 axially between the first plate 102 and the second plate 106.

Under normal operating conditions, air continuously flows through the return passage 8b from the return nozzle 18 to atmosphere via the return port 14. This protects the servo valve housing, the spool valve and the actuator from external contaminants, such as particles of sand or dust. However, when there is no flow from the return nozzle 18 to atmosphere, or there is low pressure in the return passage 8b, for example when the servo valve is not operational due to the shut-down of an associated engine, there is a risk of contamination, as air containing such particles may flow into the nozzle housing 6 through the return port 14. The misalignment of the apertures 102a of the first plate 102 with the apertures 106a of the second plate 106 provides no linear axial path for air to flow through the plates 102 and 106. Any particles in the air entering from the atmosphere that pass through an aperture 106a in the second plate 106 may not flow directly through an aperture 102a in the first plate 102, as the apertures 102a and 106a are not aligned in the direction of flow, i.e. along the longitudinal axis A. The particles may instead be impeded from passing through the return passage 8b by contacting a transverse surface of the first plate 102, and may fall, under gravity, to the bottom of the return passage 8b, or into the debris removal passage 112. Once the flow of air from the return nozzle 18 to the atmosphere resumes, the particles may be ejected via the debris removal passage 112 to the atmosphere by the flow of air.

A separating ring 104 may be disposed in the return passage 8b between the first plate 102 and the second plate 106. The separating ring 104 may be housed in the return passage 8b by an interference fit. The separating ring 104 may space the first plate 102 from the second plate 106. The separating ring 104 may be provided with an annular wall 104a having at least one opening 110 extending radially therethrough. The annular wall 104a may engage with the circumferential wall 9b of the return passage 8b such that few or no gaps are provided between the annular wall 104a of the separating ring 104 and the circumferential wall 9b of the return passage 9b. The at least one opening 110 may be aligned with and/or be in fluid communication with the inlet 114 of the debris removal passage 112.

In one embodiment, the separating ring 104 comprises two or more openings 110 extending radially through the annular wall 104a, and the nozzle housing 6 is provided with two or more debris removal passages 112, each having an inlet 114 aligned with and/or in fluid communication with one of the two or more openings 110 of the separating ring 104. For example, there may be provided three, four, or more debris removal passages 112 in the nozzle housing 6, each with an inlet 114 and an opening 110 aligned and/or in fluid communication therewith. Multiple circumferentially spaced debris removal passages 112 allow the servo valve 1 to be installed or operate in various orientations while still allowing particles to be removed from the return passage 8 via gravity. Particles may be trapped in the area defined by the separating ring 104 until flow from the return nozzle 18 to the atmosphere resumes.

A retention ring 108 may be disposed between the second plate 106 and the return port 14. The retention ring 108 may retain the first plate 102, the separating ring 104 and the second plate 106 in the return passage 8b. The return passage 8b may be provided with a stop 116 against which the first plate 102 may abut. The retention ring 108 may retain the first plate 102, the separating ring 104 and the second plate 106 against the stop 116 via interference fit with the return passage 8b. The retaining ring 108 has an opening extending axially therethrough to provide fluid communication between the at least one aperture 102a of the first plate 102 and the atmosphere.

In one example embodiment, as illustrated in FIGS. 2 and 3, the circumferential wall 9b of the return passage 8b may comprise a first portion 118 having a first diameter D1, and a second portion 120 co-axial with the first portion 118 having a second diameter D2 greater than the first diameter D1. The first portion 118 may house the return nozzle 18, via interference fit therewith. The second portion 120 may house the insert 100, via interference fit therewith. The first portion 118 and the second portion 120 may be joined by an annular wall providing the stop 116, against which the first plate 102 may be retained. In other embodiments, the stop 116 may be provided by, for example, a circumferential ridge, fillet or groove in the circumferential wall 9b of the return passage 8b. In other embodiments, no stop 116 may be provided. The insert 100 may be retained only by interference fit with the return passage 8b.

With reference to FIGS. 3 and 4, the insert 100 may be provided with at least one radially extending anti-rotation tab 122 configured to engage with at least one groove 124 provided in the circumferential wall 9b, to prevent rotation of the insert 100 and to prevent incorrect assembly. This ensures that the misalignment of the apertures 102a and 106a is maintained.

In one example, the first plate 102 and the second plate 106 are each provided with at least one anti-rotation tab 122, with each anti-rotation tab 122 engaging a groove 124 in the circumferential wall 9b to prevent either of the first plate 102 or the second plate 106 from rotating in situ. The groove 124 may extend axially along the circumferential wall 9b for the length of the insert 100, for example to stop 116. In a further example, the first plate 102 and the second plate 106 are each provided with two anti-rotation tabs 122, each anti-rotation tab 122 engaging with one of two axially extending grooves 124 in the circumferential wall 9b. The separating ring 104 and/or the retention ring 108 may also be provided with one, two, or more anti-rotation tabs 122 to engage with the grooves 124.

In the embodiment illustrated in FIG. 4, each of the first plate 102, the separating ring 104, the second plate 106 and the retention ring 108 are provided with two anti-rotation tabs 122, each of which are configured to engage one of two axially extending grooves 124 in the nozzle housing 6 to prevent rotation of the first plate 102, the separating ring 104, the second plate 106 or the retention ring 108. However, it is to be understood that any or all of the first plate 102, the separating ring 104, the second plate 106 and the retention ring 108 may be provided with one or more anti-rotation tabs 122 to engage with the one or more grooves 124.

The first plate 102, the separating ring 104, the second plate 106 and the retention ring 108 may all be made from the same material as the nozzle housing 6. This provides the insert 100 with the same thermal expansion coefficient as the surrounding nozzle housing 6, and ensures that few or no gaps are formed between the components of the insert 100 and the nozzle housing 6, thus preventing any air from being able bypass the insert 100, as the temperature fluctuates. The material may, for example, be any suitable non-magnetic metal, such as aluminium or stainless steel, e.g., austenitic stainless steel.

Although the figures and the accompanying description describe particular embodiments and examples, it is to be understood that the scope of this disclosure is not to be limited to such specific embodiments, and is, instead, to be determined by the following claims.

The invention claimed is:

1. A nozzle housing for a servo valve, the nozzle housing comprising:
a circumferential wall defining a return passage extending along a longitudinal axis (A) for holding a return nozzle, the return passage having an opening for fluid communication with a spool valve and a return port for fluid communication with atmosphere;
a first plate extending across the return passage, the first plate engaged with the circumferential wall and disposed between the opening and the return port; and
a second plate extending across the return passage, the second plate engaged with the circumferential wall and disposed between the first plate and the return port, wherein the first plate has at least one first aperture, and the second plate has at least one second aperture that is misaligned with the at least one first aperture such that there is no linear axial flow path between the return port and the opening.

2. The nozzle housing of claim 1, wherein the at least one first aperture comprises a plurality of first apertures and the at least one second aperture comprises a plurality of second apertures.

3. The nozzle housing of claim 2, wherein the each of the plurality of second apertures are disposed an equal distance or circumferential angle (θ) from the two nearest first apertures.

4. The nozzle housing of claim 1, wherein the first plate, the second plate and the nozzle housing are made from the same material.

5. The nozzle housing of claim 1, further comprising:
at least one debris removal passage extending through the circumferential wall, the at least one debris removal passage having an inlet axially between the first plate and the second plate.

6. The nozzle housing of claim 5, wherein the at least one debris removal passage comprises a plurality of circumferentially spaced debris removal passages.

7. The nozzle housing of claim 5, further comprising:
a separating ring disposed in the return passage between the first plate and the second plate,
wherein the separating ring comprises an annular wall having at least one opening extending radially therethrough and in fluid communication with the inlet of the at least one debris removal passage.

8. The nozzle housing of claim 7, further comprising:
a retention ring disposed between the second plate and the return port, the retention ring retaining the first plate, the separating ring and the second plate in the return passage.

9. The nozzle housing of claim 8, wherein the circumferential wall comprises a stop, and the first plate is disposed between the stop and the retention ring.

10. The nozzle housing of claim 8, wherein each of the first plate, the separating ring, the second plate and the retention ring have at least one anti-rotation tab, each anti-rotation tab engaging a groove in the circumferential wall.

11. The nozzle housing of claim 1, wherein the first plate and the second plate each have at least one anti-rotation tab, each anti-rotation tab engaging a groove in the circumferential wall.

12. The nozzle housing of claim 1, wherein the first plate and the second plate are planar.

13. A single stage air servo valve comprising:
the nozzle housing of claim 1,
wherein the nozzle housing comprises a flapper cavity and first and second nozzle cavities, wherein the first nozzle cavity comprises the return passage, the second nozzle cavity comprises a supply passage, the supply passage has an inlet, an opening, and a supply nozzle disposed therebetween, and the return passage has the return nozzle disposed between the opening of the return passage and the first plate; and
a flapper disposed in the flapper cavity between the opening of the supply passage and the opening of the return passage.

14. The servo valve of claim 13, wherein a total cross-sectional area of the at least one first aperture is at least five times greater than a cross-sectional area of an orifice of the return nozzle.

15. The servo valve of claim 13, wherein a total cross-sectional area of the at least one second aperture is at least five times greater than a cross-sectional area of an orifice of the return nozzle.

* * * * *